Feb. 23, 1926.

W. J. DEWHIRST

PIT TOOL

Filed Nov. 9, 1925

Inventor
Walter J. Dewhirst
By Lyon & Lyon
Attorneys.

Patented Feb. 23, 1926.

1,573,918

UNITED STATES PATENT OFFICE.

WALTER J. DEWHIRST, OF LOS ANGELES, CALIFORNIA.

PIT TOOL.

Application filed November 9, 1925. Serial No. 67,836.

*To all whom it may concern:*

Be it known that I, WALTER J. DEWHIRST, a citizen of the United States, residing at 2411 Westview Street, Los Angeles, in the county of Los Angeles, State of California, have invented a new and useful Pit Tool, of which the following is a specification.

This invention relates to pit tools and more particularly to a tool or device for use in pits employed for the repair, removal and renewal of parts of vehicles, particularly automobiles.

In the repair of automobiles and in the replacement of parts thereof, it is a common practice to employ a pit, which is an elongated, rectangular hole formed in the ground over which the motor vehicle is driven so that access may be had to the parts of the motor vehicle from beneath. Many of these parts are extremely heavy and difficult to handle from a position within the pit and after having been removed and placed within the pit are difficult to remove therefrom to the proper place of repair, and it is also difficult, when working in a pit, to raise the respective parts to their proper position for replacement in the automobile. Such parts as heavy differential casings, dynamos, generators and the like are only handled with extreme difficulty from within a pit, and serious accidents have occurred during the removal of these heavy articles due to the inability of the person removing the same to support the weight of these articles when removed from their positions in the vehicle.

It is therefore an object of this invention to provide a pit tool or carriage that may be employed in pits or the like, which is adapted to receive and support portions or parts of a motor vehicle that are removed therefrom for repair, replacement or the like, and which pit tool may be run under the vehicle to receive the part and run from under the vehicle to carry the part out to a point of delivery at the end of the pit. Another object of this invention is to provide a pit tool or carriage that is adjustable so as to be adapted for use in connection with pits of varying widths. Another object of this invention is to provide a pit tool, the supporting carriage of which is adjustable transversely of the pit and vertically so that the same may be adjusted to the desired position to receive the part or parts to be removed from the motor vehicle. Another object of this invention is to provide an attachment for the pit tool so that the same may be employed as a jack or the like to raise any desired portion of the motor vehicle, such as the wheels, when it is desired to work on the parts.

Other objects and advantages of this invention will be apparent from the following detailed description or a preferred embodiment thereof, as illustrated in the accompanying drawings, in which drawings.

Figure 1:
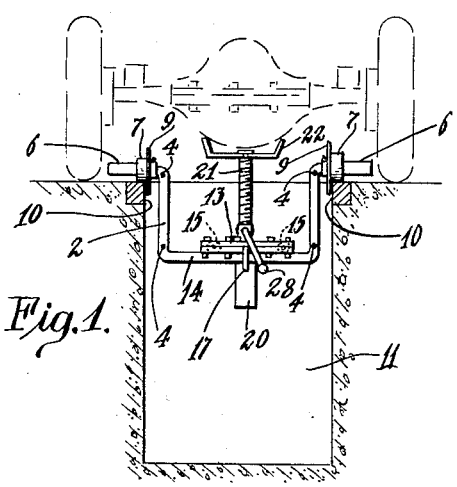
Fig. 1 is a side elevation of a pit tool embodying this invention, illustrating the same as positioned within a pit and in position to support a differential of a motor vehicle.

In the preferred embodiment of this invention shown in the accompanying drawings, 1 illustrates a U-shaped frame spaced from a second U-shaped frame 2 by means of stay bars 3, the stay bars 3 being inserted through bores formed in the tubular members forming the U-shaped frame members 1 and 2, and being locked in position by means of the nuts 4 which are screw-threaded to the stay rods 3 at the opposite sides of the frame members 1 and 2, respectively. Mounted on the upper extensions 5 of the frames 1 and 2 are sleeves 6, upon which sleeves 6, wheels 7 are journaled on bearings 8, which wheels 7 have annular flanges 9 formed on their inner sides so as to engage the sides 10 of the pit 11 to prevent transverse movement of the pit tool relative to the pit. The sleeves 6 are adjustable upon the extensions 5 of the frames 1 and 2 and are secured in the adjusted position by any suitable or desirable means, such as the set screws 12.

A carriage 13 is supported between the U-shaped frame members 1 and 2 on the lower extensions 14 thereof, the carriage 13 being transversely movable upon rollers 15 which are journaled on pins 16 in recesses formed in the carriage 13. The rollers 15 have concave surfaces adapted to fit the curvature of the tubular members forming the frames 1 and 2.

Figure 3:
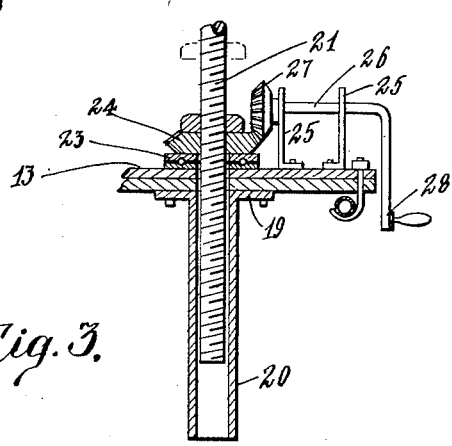
Fig. 3 is a fragmental side elevation, mainly in vertical section, illustrating means provided for the vertical adjustment of the receiving cradle.
Figure 5:
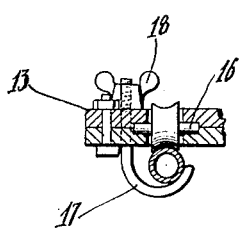
Fig. 5 is a fragmental end elevation, illustrating locking means provided for locking the transversely movable carriage in the adjusted transverse position.

In order to lock the carriage 13 in any desired position, a plurality of hooks 17 are provided which pass through bores formed in the carriage 13 and are provided at their upper ends with thumb screws 18, the hooks 17 passing over the lower extension 14 of the frame members 1 and 2, so that when the thumb screw 18 is screw-threaded upon the end of the hook 17, the extension 14 of the frame 1 will be locked against the periphery of the roller 15, preventing further transverse movement of the carriage 13. Secured to the underneath surface of the carriage 13 at a flange 19, is a sleeve 20, which sleeve 20 provides a guide for the screw 21, to the upper end of which screw 21 a carriage 22 is secured, as illustrated in Fig. 1. Surrounding the screw 21 is an end thrust bearing 23, upon which a beveled gear 24 is mounted, which beveled gear is internally threaded. Mounted in brackets 25 on the standard 13, is a shaft 26, to the inner end of which shaft 26, a beveled gear 27 is secured, which beveled gear 27 meshes with and drives the beveled gear 24. The shaft 26 is bent downwardly, as illustrated in Fig. 3, to provide a crank 28 for rotating the gear 27.

The screw 21 is screw-threaded through the central bore of the beveled gear 24 so that when the beveled gear 24 is rotated, the screw 21, and hence the carriage 22, is raised or lowered, depending upon the direction of rotation of the crank 28.

Figure 6:
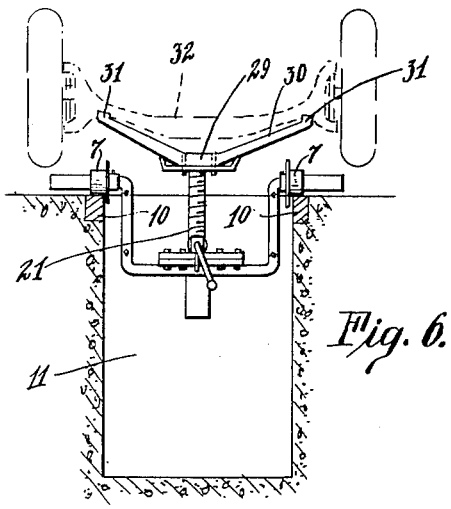
Fig. 6 is a side elevation of a pit tool embodying this invention, illustrating the same as attached to the jack attachment and illustrating the tool as positioned in a pit and in use as a jack for lifting the front wheels of a motor vehicle.
Figure 2:
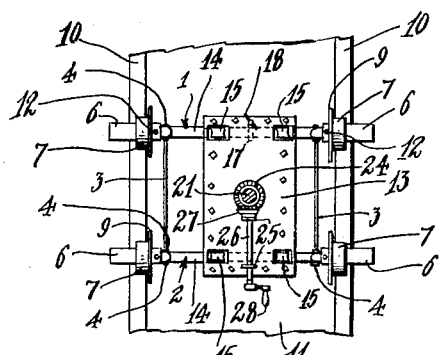
Fig. 2 is a top plan view thereof, illustrating a pit tool with the receiving cradle removed.
Figure 4:
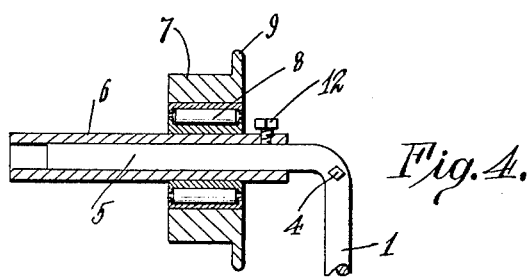
Fig. 4 is a fragmental side elevation, mainly in vertical section, illustrating a preferred form of means for adjusting the spread between the wheels of the carriage to accommodate the pit tool for different widths of pits.

Referring now to Fig. 6, the upper end of the screw 21 is freely journaled into a body 29 of a truss frame, which includes a pair of outwardly extending arms 30 having seats 31 formed in their upper ends adapted to fit the axle 32 of a motor vehicle or the like, so that when the crank 28 is rotated, the pit tool operates as a jack to raise or lower the motor vehicle as desired, over the pit. In particular cases, where the motor vehicle has been partly taken apart and is being repaired, two such pit tools could be employed, one under each axle of the motor vehicle, and the motor vehicle could be carried along to the far end of the pit and lowered down again, and in this manner be taken out of the way. This is particularly useful in case of large garages, where long pits are employed, and where in many cases a motor vehicle positioned over the central portion of the pit and temporarily disabled due to inability to obtain repair parts, has blocked one or the other ends of the pit for further use. In this case, as previously described, the motor vehicle could be lifted upon two such pit tools and carried easily to the end of the pit out of the way.

Having fully described a preferred embodiment of this invention, it is to be understood that I do not wish to be limited to the exact details of construction herein set forth, which may obviously be varied without departing from the spirit of my invention as set forth in the appended claims.

I claim:

1. In a device of the class described, the combination of a U shaped frame, upper extensions on the said frame, wheels journaled on the said extensions, a carriage supported on the said frame on the lower extension thereof, a screw threaded through a gear supported by said carriage, a cradle supported by the screw, and means for rotating the gear to raise or lower said cradle on the screw.

2. In a device of the class described, the combination of a U shaped frame, upper extensions on the said frame, wheels journaled on bearings adjustably mounted on the said frame, a screw threaded through a gear supported by the said wheels, a cradle supported by the screw, and means for rotating the gear to raise or lower the said cradle on the screw.

3. In a device of the class described, the combination of a U shaped frame, upper extensions on the said frame, sleeves adjustably secured to said extensions, wheels journaled on bearings on the said sleeves, annular guide flanges formed on the inner adjacent sides of the said wheels, a carriage supported by the frame, a screw threaded through a gear supported by the said carriage, a cradle supported by the screw, and means for rotating the gear to raise or lower the said cradle.

4. In a device of the class described, the combination of a U shaped frame, upper extensions on the said frame, wheels adjustably journaled on bearings on the said extensions, a carriage adjustably supported on the said frame, a screw threaded through a gear supported by the carriage, a cradle supported by the screw, and means for rotating the gear to raise or lower the said cradle.

5. In a device of the class described, the combination of a pair of tubular U shaped members, means for securing the said tubular shaped members together in spaced relation, wheels journaled on upper extensions of the said U-shaped tubular members, a carriage mounted on rollers on the said tubular shaped members, means for locking the carriage in position on the said tubular shaped members, a cradle, and means secured to the carriage for adjusting the cradle vertically.

6. In a device of the class described, the combination of a pair of U shaped tubular frame members, wheels journaled on bearings adjustably secured to extensions of the said frame members, a carriage supported on rollers on the tubular frame members on the lower extension thereof, a screw threaded through a gear supported by the said carriage, a cradle supported by the screw, and means for rotating the gear to raise or lower the said cradle.

7. In a device of the class described, the combination of a pair of U shaped tubular frame members, wheels journaled on bearings adjustably secured to extensions of the said frame members, a carriage supported on rollers on the said tubular frame members, means for securing the tubular frame members together in spaced relation, means for locking the said carriage in position on the tubular frame members, a beveled gear journaled on an end-thrust bearing on the said carriage, a screw threaded through the said gear, a crank, a gear secured to the end of the said crank in position to mesh with the first said gear, and means for rotatably supporting a crank on the carriage.

8. In a device of the class described, the combination of a U-shaped frame adapted to be mounted in a pit and moved longitudinally therein, the U-shaped frame having a lower extension, a carriage, means supporting the carriage on the lower extension so as to permit the same to be moved transversely of the frame, a cradle, and means secured to the carriage for moving the cradle vertically.

Signed at Los Angeles, Calif., this 3d day of November, 1925.

WALTER J. DEWHIRST.